D. BROBSTON.
Sand Sifters.
No. 142,987.            Patented September 23, 1873.
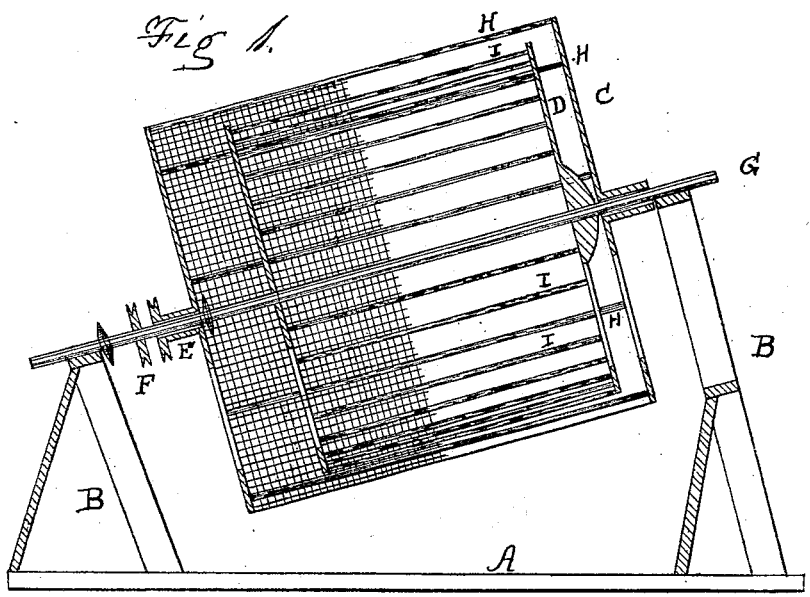
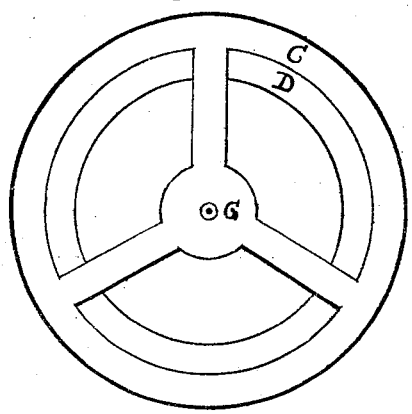
Witnesses.
E. A. West
A. W. Bond
Dan'l Brobston
Inventor

UNITED STATES PATENT OFFICE.

DAN BROBSTON, OF CHICAGO, ILLINOIS.

IMPROVEMENT IN SAND-SIFTERS.

Specification forming part of Letters Patent No. 142,987, dated September 23, 1873; application filed August 1, 1872.

*To all whom it may concern:*

Be it known that I, DAN BROBSTON, of the city of Chicago, in the county of Cook and State of Illinois, have invented certain new and useful Improvements in Device for Sifting Wet Sand, of which the following is a full description, reference being had to the accompanying drawings making a part of this specification, in which—

Figure 1 is a longitudinal section, and Fig. 2 an end view, without the supporting-frame.

The object of this invention is to provide a machine or device for sifting wet sand, and to avoid the clogging of the sieves in the operation; and its nature consists in providing the inside of the revolving sieve with a rubber to force the sand through and prevent clogging, and in the arrangement and combination of the several parts.

In the drawings, A B represent any suitable frame-work; C, cylindrical sieve; D, rubber; E, collar, with pulley-wheel to operate the sieve; F, pulley-wheel to operate the rubber; G, center-shaft; H, connecting-rods in the sieve; and I, rods forming the rubber. The cylindrical sieve C is made of wire, of suitable size and meshes; the ends are made of cast-iron, or other suitable material, and are held together by the rods H, which partially relieve the strain on the sieve. The rubber D is also made cylindrical; the end pieces are made in the same way as the ends of the sieve, but of a little less diameter, to cause it to run within about an inch of the sieve. These end pieces are connected entirely by the rods I, which are placed close enough together to prevent the falling through of any stone which would not pass between the rubber and the sieve, and about eight inches shorter, so as to leave room at the lower end to discharge stones. At the upper end the rubber and sieve should run as close together as possible.

In operation, I elevate one end, as shown at Fig. 1, and place on the elevated end a hopper for discharging sand into the sieve between the arms of the end pieces. Wet sand will pass readily through the bars I of the rubber or interior sieve D onto the sieve C, where it would adhere or remain if not rubbed through. The cylinders C and D revolve in opposite directions, which is easily done by crossing one of the bands running on the pulleys E or F, and by this motion the sand is rubbed through and discharged onto the ground, or into a receptacle placed below the sieve. The stones or other coarse material pass over the cylinder D and out at the lower end of the cylinder C onto the ground, thus forming a separation at the end of the sieve.

By the use of this device I am enabled to sift sand just taken out of the water thoroughly and rapidly.

What I claim as new is as follows:

The combination of the cylinder or rubber D with the cylindrical sieve C, arranged to receive the material through one end and discharge the coarser matters through the other, and operated by the collar and pulley-wheels, E F, substantially as and for the purpose specified.

DAN BROBSTON.

Witnesses:
   E. A. WEST,
   O. W. BOND.